(12) United States Patent
Wang et al.

(10) Patent No.: US 12,002,183 B2
(45) Date of Patent: Jun. 4, 2024

(54) IMAGE SCALING METHOD AND APPARATUS THEREOF

(71) Applicant: Glenfly Tech Co., Ltd., Shanghai (CN)

(72) Inventors: Xiaofei Wang, Shanghai (CN); Yuan Jiang, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 355 days.

(21) Appl. No.: 17/676,605

(22) Filed: Feb. 21, 2022

(65) Prior Publication Data

US 2023/0169624 A1 Jun. 1, 2023

(30) Foreign Application Priority Data

Nov. 26, 2021 (CN) .......................... 202111425284.5

(51) Int. Cl.
*G06T 7/10* (2017.01)
*G06T 3/4007* (2024.01)
*G06T 3/4023* (2024.01)

(52) U.S. Cl.
CPC .......... *G06T 3/4023* (2013.01); *G06T 3/4007* (2013.01)

(58) Field of Classification Search
CPC ......... G06T 7/60; G06T 7/001; G06T 3/4023; G06T 3/4007; G06K 9/6256; A61B 6/4028; A61B 1/00193; A61B 6/035; A61B 6/52; H04N 5/247; H04N 9/0455
See application file for complete search history.

(56) References Cited

U.S. PATENT DOCUMENTS 11,115,581 B2 * 9/2021 Ugawa ................. H04N 23/672
2002/0158856 A1 * 10/2002 Deering ................ G06F 3/1431
345/204

* cited by examiner

Primary Examiner — Phuoc H Doan (57) ABSTRACT

The present disclosure relates to an image scaling method and an apparatus thereof. The method includes: for at least one interpolation pixel in a source image, grouping at least two adjacent pixels of the interpolation pixel to obtain adjacent pixel sets; no intersection existing between the adjacent pixel sets; determining, based on position relationships between the interpolation pixel and regions formed by the adjacent pixel sets, virtual interpolation pixels corresponding to the interpolation pixel in the regions formed by the adjacent pixel sets respectively; calculating corresponding pixel sampling values of the virtual interpolation pixels in the source image according to a preset bilinear interpolation algorithm respectively; and generating theoretical pixel values corresponding to the interpolation pixel based on the pixel sampling values corresponding to the virtual interpolation pixels; the theoretical pixel values being configured to perform image scaling on the source image. The processing efficiency of the image scaling can be improved with the method.

16 Claims, 8 Drawing Sheets

For at least one interpolation pixel in a source image, group at least two adjacent pixels of the interpolation pixel to obtain adjacent pixel sets; no intersection existing between the adjacent pixel sets — S110

Determine, based on position relationships between the interpolation pixel and regions formed by the adjacent pixel sets, virtual interpolation pixels corresponding to the interpolation pixel in the regions formed by the adjacent pixel sets respectively — S120

Calculate corresponding pixel sampling values of the virtual interpolation pixels in the source image according to a preset bilinear interpolation algorithm respectively — S130

Generate theoretical pixel values corresponding to the interpolation pixel based on the pixel sampling values corresponding to the virtual interpolation pixels; the theoretical pixel values being configured to perform image scaling on the source image — S140

FIG. 8

IMAGE SCALING METHOD AND APPARATUS THEREOF

CROSS-REFERENCE TO RELATED APPLICATIONS

This application claims priority and/or benefit for Chinese Application No. 202111425284.5, filed Nov. 26, 2021, entitled IMAGE SCALING METHOD AND APPARATUS THEREOF, the specification of which is incorporated by reference herein in its entirety.

TECHNICAL FIELD

The present disclosure relates to the field of image processing technologies, and in particular, to an image scaling method and an apparatus thereof.

BACKGROUND

Image magnification is one of the most important technologies in digital image processing. Common magnification methods include a bicubic interpolation algorithm and the like. Although the bicubic interpolation algorithm in the conventional art can better retain high-frequency information of an image, the amount of computation and hardware implementation are very difficult, which leads to poor image magnification efficiency.

SUMMARY

Based on the above, there is a need to provide an image scaling method and an apparatus thereof that can improve image scaling efficiency with respect to the above technical problems.

In a first aspect, the present disclosure provides an image scaling method, wherein the method includes:
    for at least one interpolation pixel in a source image, grouping at least two adjacent pixels of the interpolation pixel to obtain adjacent pixel sets; no intersection existing between the adjacent pixel sets;
    determining, based on position relationships between the interpolation pixel and regions formed by the adjacent pixel sets, virtual interpolation pixels corresponding to the interpolation pixel in the regions formed by the adjacent pixel sets respectively;
    calculating corresponding pixel sampling values of the virtual interpolation pixels in the source image according to a preset bilinear interpolation algorithm respectively; and
    generating theoretical pixel values corresponding to the interpolation pixel based on the pixel sampling values corresponding to the virtual interpolation pixels; the theoretical pixel values being configured to perform image scaling on the source image.

In one embodiment, the step of determining, based on position relationships between the interpolation pixel and regions formed by the adjacent pixel sets, virtual interpolation pixels corresponding to the interpolation pixel in the regions formed by the adjacent pixel sets respectively includes:
    acquiring fractional parts of pixel coordinates of the interpolation pixel; the fractional parts being configured to represent the position relationships between the interpolation pixel and the regions formed by the adjacent pixel sets; and
    calculating weights of adjacent pixels in the adjacent pixel sets in at least two directions according to the fractional parts based on a preset bicubic interpolation algorithm; and
    determining, based on the weights of the adjacent pixels in the adjacent pixel sets in the at least two directions, the virtual interpolation pixels corresponding to the interpolation pixel in the regions formed by the adjacent pixel sets.

In one embodiment, the step of determining, based on position relationships between the interpolation pixel and regions formed by the adjacent pixel sets, virtual interpolation pixels corresponding to the interpolation pixel in the regions formed by the adjacent pixel sets respectively includes:
    acquiring fractional parts of pixel coordinates of the interpolation pixel; the fractional parts being configured to represent the position relationships between the interpolation pixel and the regions formed by the adjacent pixel sets; and
    querying a first pre-established look-up table for virtual interpolation pixels corresponding to coordinates formed by the fractional parts as the virtual interpolation pixels of the interpolation pixel; wherein a first mapping relationship between different preset coordinates and different virtual interpolation pixels is recorded in the first look-up table.

In one embodiment, the first look-up table is a first texture image, the first texture image is an image generated by fitting the first mapping relationship, and the step of querying a first pre-established look-up table for virtual interpolation pixels corresponding to coordinates formed by the fractional parts as the virtual interpolation pixels of the interpolation pixel includes:
    performing bilinear interpolation on the first texture image by using the coordinates formed by the fractional parts, to obtain first interpolation results corresponding to the coordinates formed by the fractional parts; and
    taking the first interpolation results corresponding to the coordinates formed by the fractional parts as the virtual interpolation pixels of the interpolation pixel.

In one embodiment, the step of generating theoretical pixel values corresponding to the interpolation pixel based on the pixel sampling values corresponding to the virtual interpolation pixels includes:
    acquiring, based on the position relationships between the interpolation pixel and the regions formed by the adjacent pixel sets, grouping weights corresponding to the adjacent pixel sets; and
    weighting and summing the pixel sampling values corresponding to the virtual interpolation pixels according to the grouping weights corresponding to the adjacent pixel sets, to obtain the theoretical pixel values corresponding to the interpolation pixel.

In one embodiment, the step of acquiring, based on the position relationships between the interpolation pixel and the regions formed by the adjacent pixel sets, grouping weights corresponding to the adjacent pixel sets includes:
    acquiring fractional parts of pixel coordinates of the interpolation pixel; the fractional parts being configured to represent the position relationships between the interpolation pixel and the regions formed by the adjacent pixel sets; and
    calculating weights of adjacent pixels in the adjacent pixel sets in at least two directions according to the fractional parts based on a preset bicubic interpolation algorithm; and determining the grouping weights corresponding to the adjacent pixel set according to the weights of the adjacent pixels in the adjacent pixel sets in the at least two directions.

In one embodiment, the step of acquiring, based on the position relationships between the interpolation pixel and the regions formed by the adjacent pixel sets, grouping weights corresponding to the adjacent pixel sets includes:

acquiring fractional parts of pixel coordinates of the interpolation pixel; the fractional parts being configured to represent the position relationships between the interpolation pixel and the regions formed by the adjacent pixel sets; and querying a second pre-established look-up table for grouping weights corresponding to coordinates formed by the fractional parts, to obtain the grouping weights corresponding to the adjacent pixel sets; wherein a second mapping relationship between different preset coordinates and different grouping weights is recorded in the second look-up table.

In one embodiment, the second look-up table is a second texture image, the second texture image is an image generated by fitting the second mapping relationship, and the step of querying a second pre-established look-up table for grouping weights corresponding to coordinates formed by the fractional parts, to obtain the grouping weights corresponding to the adjacent pixel sets includes:

performing bilinear interpolation on the second texture image by using the coordinates formed by the fractional parts, to obtain second interpolation results corresponding to the coordinates formed by the fractional parts; and determining the second interpolation results corresponding to the coordinates formed by the fractional parts as the grouping weights corresponding to the adjacent pixel sets.

In a second aspect, the present disclosure further provides an image scaling apparatus, wherein the apparatus includes:

a grouping module configured to, for at least one interpolation pixel in a source image, group at least two adjacent pixels of the interpolation pixel to obtain adjacent pixel sets; no intersection existing between the adjacent pixel sets;

a determination module configured to determine, based on position relationships between the interpolation pixel and regions formed by the adjacent pixel sets, virtual interpolation pixels corresponding to the interpolation pixel in the regions formed by the adjacent pixel sets respectively;

a sampling module configured to calculate corresponding pixel sampling values of the virtual interpolation pixels in the source image according to a preset bilinear interpolation algorithm respectively; and a generation module configured to generate theoretical pixel values corresponding to the interpolation pixel based on the pixel sampling values corresponding to the virtual interpolation pixels; the theoretical pixel values being configured to perform image scaling on the source image.

According to the image scaling method and the apparatus thereof, for at least one interpolation pixel in a source image, at least two adjacent pixels of the interpolation pixel are grouped to obtain adjacent pixel sets; no intersection exists between the adjacent pixel sets; based on position relationships between the interpolation pixel and regions formed by the adjacent pixel sets, virtual interpolation pixels corresponding to the interpolation pixel are determined in the regions formed by the adjacent pixel sets respectively; corresponding pixel sampling values of the virtual interpolation pixels in the source image are calculated according to a preset bilinear interpolation algorithm respectively; and theoretical pixel values corresponding to the interpolation pixel are generated based on the pixel sampling values corresponding to the virtual interpolation pixels; the theoretical pixel values are configured to perform image scaling on the source image. In this way, original bicubic interpolation on all adjacent pixels is equivalently replaced with bilinear interpolation on the virtual interpolation pixels of the interpolation pixels, which greatly reduces the sampling computation without affecting an image scaling effect, thereby improving the processing efficiency of the image scaling.

DETAILED DESCRIPTION

In order to make the objectives, technical solutions and advantages of the present disclosure more comprehensible, the present disclosure is described in further detail below with reference to the accompanying drawings and embodiments. It should be understood that specific embodiments described herein are intended only to interpret the present disclosure and not intended to limit the present disclosure.

Figure 1:
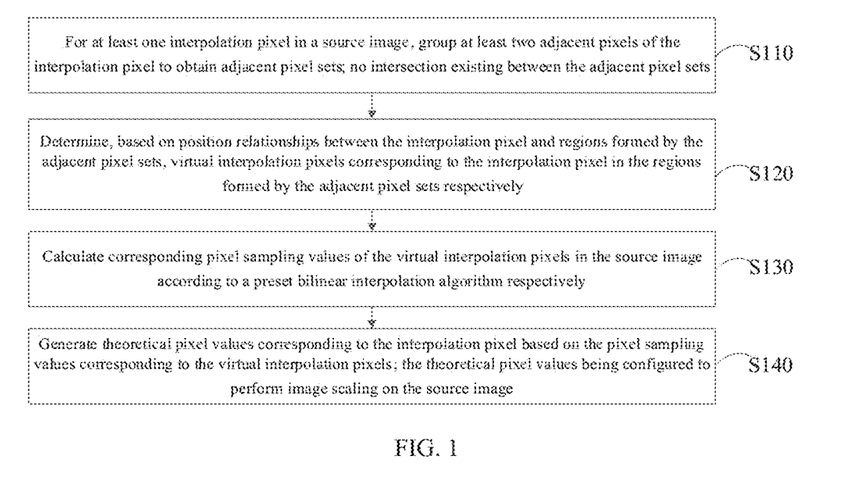
FIG. 1 is a schematic flowchart of an image scaling method according to an embodiment.

In one embodiment, as shown in FIG. 1, a schematic flowchart of an image scaling method is provided. For example, the method is applied to an image scaling apparatus, and includes the following steps.

In step S110, for at least one interpolation pixel in a source image, at least two adjacent pixels of the interpolation pixel are grouped to obtain adjacent pixel sets; no intersection exists between the adjacent pixel sets.

The source image may be an image requiring image scaling.

The interpolation pixel may to a pixel required to be interpolated.

During image scaling, generally, a pixel P in a target image is mapped back to a virtual pixel P' in the source image, and a value of the pixel P is represented (or calculated) using a color value of the pixel P'. Since coordinates of P' are generally not integers and no actual pixels correspond thereto, a method is required to calculate the value of the pixel P' from values of real pixels at integer positions. This process is known as interpolation. In practical application, the virtual pixel P' may be named as an interpolation pixel.

The adjacent pixels may be real pixels adjacent to the interpolation pixel in the source image. For example, given that coordinates of the interpolation pixel are (1.5,1.5), coordinates of the adjacent pixels of the interpolation pixel may be (1,1), (2,1), (1,2) and (2,2), etc.

The adjacent pixel set may be a set formed by a plurality of adjacent pixels.

Figure 2:
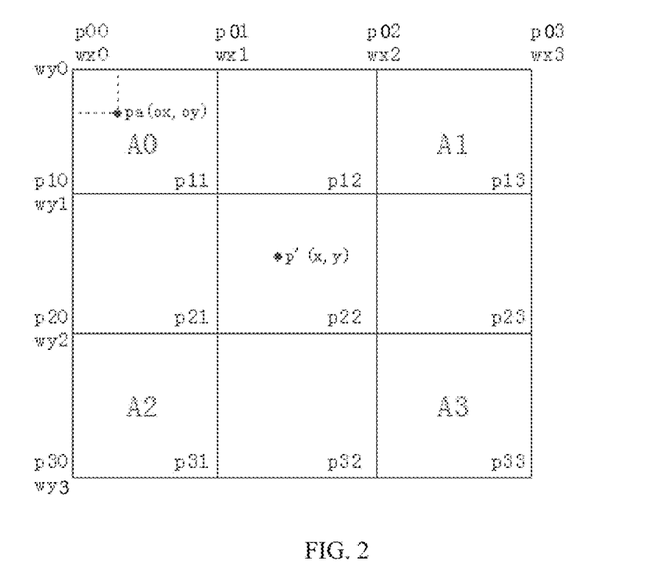
FIG. 2 is a schematic diagram of partition of adjacent pixels according to an embodiment.

To facilitate the understanding of those skilled in the art, please refer to FIG. 2, which exemplifies a schematic diagram of partition of adjacent pixels. For at least one interpolation pixel P' in the source image, the image scaling apparatus may determine at least 16 adjacent pixels p00-p33 of the interpolation pixel P'. Then, the image scaling apparatus may group the 16 adjacent pixels p00-p33, to obtain a plurality of adjacent pixel sets. No intersection exists between the adjacent pixel sets. In practical application, the image scaling apparatus may classify the 16 adjacent pixels p00-p33 into four sets A0-A3.

The adjacent pixel set A0 includes the adjacent pixel p00, the adjacent pixel p01, the adjacent pixel p10 and the adjacent pixel p11. The adjacent pixel set A1 includes the adjacent pixel p02, the adjacent pixel p03, the adjacent pixel p12 and the adjacent pixel p13. The adjacent pixel set A2 includes the adjacent pixel p20, the adjacent pixel p21, the adjacent pixel p30 and the adjacent pixel p31. The adjacent pixel set A3 includes the adjacent pixel p22, the adjacent pixel p23, the adjacent pixel p32 and the adjacent pixel p33.

In step S120, based on position relationships between the interpolation pixel and regions formed by the adjacent pixel sets, virtual interpolation pixels corresponding to the interpolation pixel are determined in the regions formed by the adjacent pixel sets respectively.

In specific implementation, after the image scaling apparatus determines the adjacent pixel sets, the image scaling apparatus may determine, based on position relationships between the interpolation pixel P' and regions A0-A3 formed by the adjacent pixel sets, virtual interpolation pixels corresponding to the interpolation pixel P' in the regions formed by the adjacent pixel sets respectively. Refer to FIG. 2, which exemplifies a virtual interpolation pixel pa of the interpolation pixel P' in the region A0.

In step S130, corresponding pixel sampling values of the virtual interpolation pixels in the source image are calculated according to a preset bilinear interpolation algorithm respectively.

In specific implementation, the image scaling apparatus may calculate corresponding pixel sampling values of the virtual interpolation pixels in the source image according to a preset bilinear interpolation algorithm respectively.

In practical application, the image scaling apparatus has built-in (hardware) support for bilinear interpolation in a texture function using an Open Graphics Library (OpenGL). When only floating-point coordinates of the virtual interpolation pixel pa are provided, the texture function may sample four points adjacent to the virtual interpolation pixel pa and calculate corresponding pixel sampling values of the virtual interpolation pixels in the source image by using a bilinear interpolation algorithm.

In step S140, theoretical pixel values corresponding to the interpolation pixel are generated based on the pixel sampling values corresponding to the virtual interpolation pixels; the theoretical pixel values are configured to perform image scaling on the source image.

In specific implementation, after the image scaling apparatus calculates the corresponding pixel sampling values of the virtual interpolation pixels in the source image, the image scaling apparatus may generate theoretical pixel values corresponding to the interpolation pixel based on the pixel sampling values corresponding to the virtual interpolation pixels. The theoretical pixel values are configured to perform image scaling on the source image.

Specifically, the image scaling apparatus may acquire grouping weights corresponding to the virtual interpolation pixels, and weight and sum the pixel sampling values corresponding to the virtual interpolation pixels based on the grouping weights, to obtain the theoretical pixel values corresponding to the interpolation pixel. In this way, the image scaling apparatus may perform image magnification on the source image based on the theoretical pixel values corresponding to the interpolation pixel.

In the image scaling method, for at least one interpolation pixel in a source image, at least two adjacent pixels of the interpolation pixel are grouped to obtain adjacent pixel sets; no intersection exists between the adjacent pixel sets; based on position relationships between the interpolation pixel and regions formed by the adjacent pixel sets, virtual interpolation pixels corresponding to the interpolation pixel are determined in the regions formed by the adjacent pixel sets respectively; corresponding pixel sampling values of the virtual interpolation pixels in the source image are calculated according to a preset bilinear interpolation algorithm respectively; and theoretical pixel values corresponding to the interpolation pixel are generated based on the pixel sampling values corresponding to the virtual interpolation pixels; the theoretical pixel values are configured to perform image scaling on the source image. In this way, original bicubic interpolation on all adjacent pixels is equivalently replaced with bilinear interpolation on the virtual interpolation pixels of the interpolation pixels, which greatly reduces the sampling computation without affecting an image scaling effect, thereby improving the processing efficiency of the image scaling.

In another embodiment, the step of determining, based on position relationships between the interpolation pixel and regions formed by the adjacent pixel sets, virtual interpolation pixels corresponding to the interpolation pixel in the regions formed by the adjacent pixel sets respectively includes: acquiring fractional parts of pixel coordinates of the interpolation pixel; calculating weights of adjacent pixels in the adjacent pixel sets in at least two directions according to the fractional parts based on s preset bicubic interpolation algorithm; and determining, based on the weights of the adjacent pixels in the adjacent pixel sets in the at least two directions, the virtual interpolation pixels corresponding to the interpolation pixel in the regions formed by the adjacent pixel sets.

The fractional parts are configured to represent the position relationships between the interpolation pixel and the regions formed by the adjacent pixel sets.

In specific implementation, when the image scaling apparatus determines, based on position relationships between the interpolation pixel P' and regions A0-A3 formed by the adjacent pixel sets, virtual interpolation pixels corresponding to the interpolation pixel P' in the regions formed by the adjacent pixel sets respectively, the image scaling apparatus may acquire fractional parts of pixel coordinates of the interpolation pixel. Then, the image scaling apparatus calculates weights of adjacent pixels in the adjacent pixel sets in at least two directions according to the fractional parts based on a preset bicubic interpolation algorithm. Finally, the image scaling apparatus may determine, based on the weights of the adjacent pixels in the adjacent pixel sets in the at least two directions, the virtual interpolation pixels corresponding to the interpolation pixel in the regions formed by the adjacent pixel sets.

Specifically, the image scaling apparatus may calculate x-direction weights wx0-wx3 and y-direction weights wy0-wy3 of the 16 adjacent pixels (p00-p33) of the interpolation pixel P'(x, y) by using a bicubic interpolation algorithm convolution kernel.

The above weight may be expressed as:

$$\begin{cases} wx_0 = \text{kernel } (1 + fx) \\ wx_1 = \text{kernel } (fx) \\ wx_2 = \text{kernel } (1 - fx) \\ wx_3 = \text{kernel } (2 - fx) \end{cases}$$

$$\begin{cases} wy_0 = \text{kernel } (1 + fy) \\ wy_1 = \text{kernel } (fy) \\ wy_2 = \text{kernel } (1 - fy) \\ wy_3 = \text{kernel } (2 - fy) \end{cases}$$

where fx is a fractional part of x, fy is a fractional part of y, and kernel is a bicubic interpolation convolution kernel function.

Then, the image scaling apparatus may calculate coordinate points of the virtual interpolation pixels based on the x-direction weights wx0-wx3 and the y-direction weights wy0-wy3 of the 16 adjacent pixels (p00-p33), so as to determine the virtual interpolation pixels corresponding to the interpolation pixel.

The virtual interpolation pixel may be expressed as:

$$pa_0 \cdot ox = pa_2 \cdot ox = \frac{wx_1}{wx_0 + wx_1}$$

$$pa_1 \cdot ox = pa_3 \cdot ox = \frac{wx_3}{wx_2 + wx_3}$$

$$pa_0 \cdot oy = pa_1 \cdot oy = \frac{wy_1}{wy_0 + wy_1}$$

$$pa_2 \cdot oy = pa_3 \cdot oy = \frac{wy_3}{wy_2 + 2y_3}$$

where $pa_n \cdot ox$ denotes an abscissa of an $n^{th}$ virtual interpolation pixel; and $pa_n \cdot oy$ denotes an ordinate of the $n^{th}$ virtual interpolation pixel.

According to the technical solution of this embodiment, fractional parts of pixel coordinates of the interpolation pixel are acquired, and weights of adjacent pixels in the adjacent pixel sets in at least two directions are calculated according to the fractional parts based on a preset bicubic interpolation algorithm; then, based on the weights of the adjacent pixels in the adjacent pixel sets in the at least two directions, the virtual interpolation pixels corresponding to the interpolation pixel are determined in the regions formed by the adjacent pixel sets, so that the virtual interpolation pixels corresponding to the interpolation pixel can be determined accurately, and original bicubic interpolation sampling on all adjacent pixels is equivalently replaced with bilinear interpolation sampling on the virtual interpolation pixels of the interpolation pixels, which greatly reduces the sampling computation without affecting an image scaling effect, thereby improving the processing efficiency of the image scaling.

In another embodiment, the step of generating theoretical pixel values corresponding to the interpolation pixel based on the pixel sampling values corresponding to the virtual interpolation pixels includes: acquiring, based on the position relationships between the interpolation pixel and the regions formed by the adjacent pixel sets, grouping weights corresponding to the adjacent pixel sets; and weighting and summing the pixel sampling values corresponding to the virtual interpolation pixels according to the grouping weights corresponding to the adjacent pixel sets, to obtain the theoretical pixel values corresponding to the interpolation pixel.

In specific implementation, when the image scaling apparatus generates theoretical pixel values corresponding to the interpolation pixel based on the pixel sampling values corresponding to the virtual interpolation pixels, the image scaling apparatus may acquire, based on the position relationships between the interpolation pixel and the regions formed by the adjacent pixel sets, grouping weights corresponding to the adjacent pixel sets; finally, the image scaling apparatus weights and sums the pixel sampling values corresponding to the virtual interpolation pixels according to the grouping weights corresponding to the adjacent pixel sets, to obtain the theoretical pixel values corresponding to the interpolation pixel.

Specifically, the image scaling apparatus may perform bilinear sampling at the virtual interpolation point $pa_n$, and multiply a sampling result by a grouping weight $wa_n$ to calculate a cumulative sum, so as to obtain the theoretical pixel value of the interpolation pixel P'.

The theoretical pixel value of the interpolation pixel P' may be expressed as $$P'(x, y) = \sum_{n=0}^{3} wa_n * bilinear(pa_n)$$

where $wa_n$ denotes a grouping weight corresponding to an $n^{th}$ virtual interpolation pixel, and $pa_n$ denotes the $n^{th}$ virtual interpolation pixel.

According to the technical solution of this embodiment, based on the position relationships between the interpolation pixel and the regions formed by the adjacent pixel sets, grouping weights corresponding to the adjacent pixel sets are acquired; and the pixel sampling values corresponding to the virtual interpolation pixels are weighted and summed according to the grouping weights corresponding to the adjacent pixel sets, to obtain the theoretical pixel values corresponding to the interpolation pixel, which greatly reduces the sampling computation without affecting an image scaling effect, thereby improving the processing efficiency of the image scaling.

In another embodiment, the step of acquiring, based on the position relationships between the interpolation pixel and the regions formed by the adjacent pixel sets, grouping weights corresponding to the adjacent pixel sets includes: acquiring fractional parts of pixel coordinates of the interpolation pixel; calculating weights of adjacent pixels in the adjacent pixel sets in at least two directions according to the fractional parts based on a preset bicubic interpolation algorithm; and determining the grouping weights corresponding to the adjacent pixel set according to the weights of the adjacent pixels in the adjacent pixel sets in the at least two directions.

In specific implementation, when the image scaling apparatus acquires, based on the position relationships between the interpolation pixel and the regions formed by the adjacent pixel sets, grouping weights corresponding to the adjacent pixel sets, the image scaling apparatus may acquire fractional parts of pixel coordinates of the interpolation pixel; then, the image scaling apparatus calculates weights of adjacent pixels in the adjacent pixel sets in at least two directions according to the fractional parts based on a preset bicubic interpolation algorithm. Finally, the image scaling apparatus determines the grouping weights corresponding to the adjacent pixel set according to the weights of the adjacent pixels in the adjacent pixel sets in the at least two directions.

Specifically, the image scaling apparatus may determine the grouping weights corresponding to the adjacent pixel set based on the x-direction weights wx0-wx3 and the y-direction weights wy0-wy3 of the 16 adjacent pixels (p00-p33).

The grouping weight may be expressed as:

$$\begin{cases} wa_0 = (wx_0 + wx_1) * (wy_0 + wy_1) \\ wa_1 = (wx_2 + wx_3) * (wy_0 + wy_1) \\ wa_2 = (wx_0 + wx_1) * (wy_2 + wy_3) \\ wa_3 = (wx_2 + wx_3) * (wy_2 + wy_3) \end{cases}$$

Figure 3:
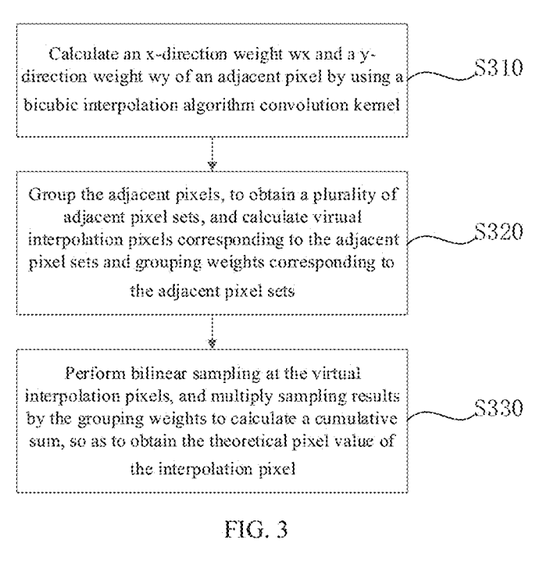
FIG. 3 is a schematic flowchart of interpolation of an image scaling method according to an embodiment.

In order to facilitate the understanding of those skilled in the art, FIG. 3 provides a flowchart of interpolation of an image scaling method. Referring to FIG. 3, the interpolation process includes at least the following steps.

In step S310, the image scaling apparatus may calculate x-direction weights wx0-wx3 and y-direction weights wy0-wy3 of 16 adjacent pixels (p00-p33) of an interpolation pixel P'(x, y) by using a bicubic interpolation algorithm convolution kernel.

In step S320, the image scaling apparatus may group the 16 adjacent pixels p00-p33, to obtain a plurality of adjacent pixel sets. Coordinate points of the virtual interpolation pixels are calculated based on the x-direction weights wx0-wx3 and the y-direction weights wy0-wy3 of the 16 adjacent pixels (p00-p33). Grouping weights corresponding to the adjacent pixel set are determined based on the x-direction weights wx0-wx3 and the y-direction weights wy0-wy3 of the 16 adjacent pixels (p00-p33).

In step S330, the image scaling apparatus may perform bilinear sampling at the virtual interpolation pixel $pa_n$, and multiply the sampling result by a grouping weight $wa_n$ to calculate a cumulative sum, so as to obtain the theoretical pixel value of the interpolation pixel P'.

According to the technical solution in this embodiment, fractional parts of pixel coordinates of the interpolation pixel are acquired; weights of adjacent pixels in the adjacent pixel sets in at least two directions are calculated according to the fractional parts based on a preset bicubic interpolation algorithm; and the grouping weights corresponding to the adjacent pixel set are determined according to the weights of the adjacent pixels in the adjacent pixel sets in the at least two directions, which facilitates subsequent weighting and summing of the pixel sampling values corresponding to the virtual interpolation pixels to obtain the theoretical pixel values of the interpolation pixel.

Figure 4:
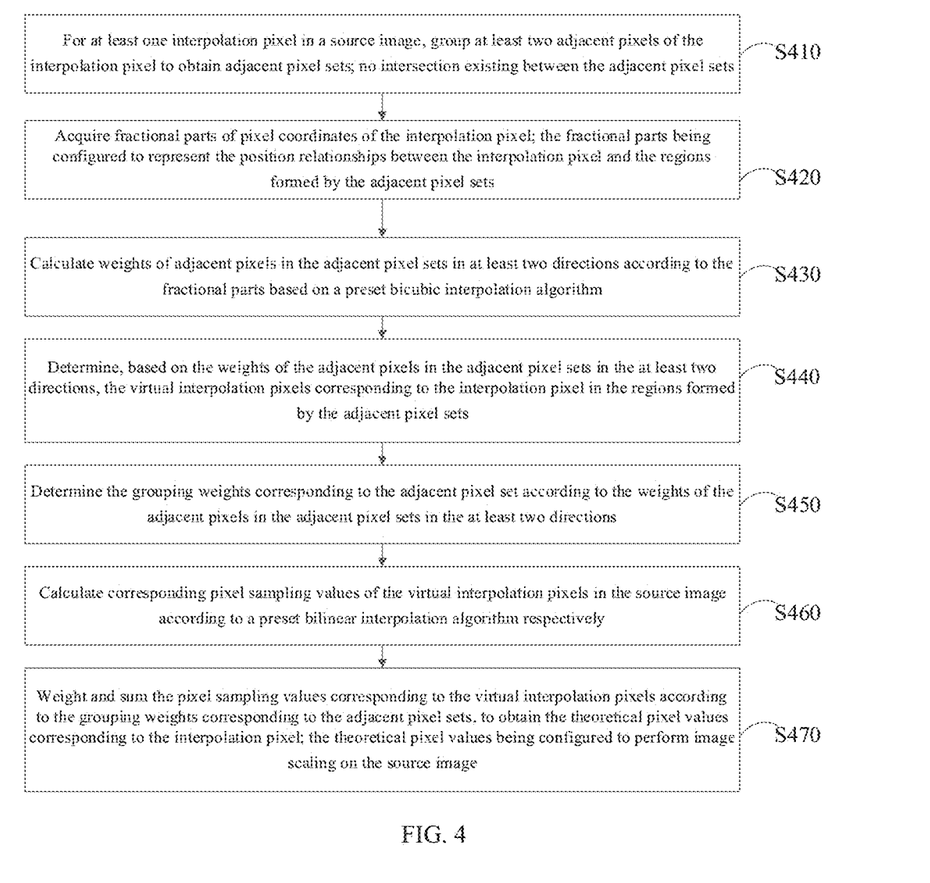
FIG. 4 is a schematic flowchart of an image scaling method according to another embodiment.

In another embodiment, as shown in FIG. 4, an image scaling method is provided. For example, the method is applied to an image scaling apparatus, and includes the following steps:

In step S410, for at least one interpolation pixel in a source image, at least two adjacent pixels of the interpolation pixel are grouped to obtain adjacent pixel sets; no intersection exists between the adjacent pixel sets.

In step S420, fractional parts of pixel coordinates of the interpolation pixel are acquired; the fractional parts being configured to represent the position relationships between the interpolation pixel and the regions formed by the adjacent pixel sets.

In step S430, weights of adjacent pixels in the adjacent pixel sets in at least two directions are calculated according to the fractional parts based on a preset bicubic interpolation algorithm.

In step S440, based on the weights of the adjacent pixels in the adjacent pixel sets in the at least two directions, the virtual interpolation pixels corresponding to the interpolation pixel are determined in the regions formed by the adjacent pixel sets.

In step S450, the grouping weights corresponding to the adjacent pixel set are determined according to the weights of the adjacent pixels in the adjacent pixel sets in the at least two directions.

In step S460, corresponding pixel sampling values of the virtual interpolation pixels in the source image are calculated according to a preset bilinear interpolation algorithm respectively.

In step S470, the pixel sampling values corresponding to the virtual interpolation pixels are weighted and summed according to the grouping weights corresponding to the adjacent pixel sets, to obtain the theoretical pixel values corresponding to the interpolation pixel; the theoretical pixel values are configured to perform image scaling on the source image.

In another embodiment, the step of determining, based on position relationships between the interpolation pixel and regions formed by the adjacent pixel sets, virtual interpolation pixels corresponding to the interpolation pixel in the regions formed by the adjacent pixel sets respectively includes: acquiring fractional parts of pixel coordinates of the interpolation pixel; the fractional parts being configured to represent the position relationships between the interpolation pixel and the regions formed by the adjacent pixel sets; and querying a first pre-established look-up table for virtual interpolation pixels corresponding to coordinates formed by the fractional parts as the virtual interpolation pixels of the interpolation pixel; wherein a first mapping relationship between different preset coordinates and different virtual interpolation pixels is recorded in the first look-up table. The first look-up table is a first texture image, the first texture image is an image generated by fitting the first mapping relationship, and the step of querying a first pre-established look-up table for virtual interpolation pixels corresponding to coordinates formed by the fractional parts as the virtual interpolation pixels of the interpolation pixel includes: performing bilinear interpolation on the first texture image by using the coordinates formed by the fractional parts, to obtain first interpolation results corresponding to the coordinates formed by the fractional parts; and taking the first interpolation results corresponding to the coordinates formed by the fractional parts as the virtual interpolation pixels of the interpolation pixel.

The step of acquiring, based on the position relationships between the interpolation pixel and the regions formed by the adjacent pixel sets, grouping weights corresponding to the adjacent pixel sets includes: acquiring fractional parts of pixel coordinates of the interpolation pixel; and querying a second pre-established look-up table for grouping weights corresponding to coordinates formed by the fractional parts, to obtain the grouping weights corresponding to the adjacent pixel sets; wherein a second mapping relationship between different preset coordinates and different grouping weights is recorded in the second look-up table. The second look-up table is a second texture image, the second texture image is an image generated by fitting the second mapping relationship, and the step of querying a second pre-established look-up table for grouping weights corresponding to coordinates formed by the fractional parts, to obtain the grouping weights corresponding to the adjacent pixel sets includes: performing bilinear interpolation on the second texture image by using the coordinates formed by the fractional parts, to obtain second interpolation results corresponding to the coordinates formed by the fractional parts; and determining the second interpolation results corresponding to the coordinates formed by the fractional parts as the grouping weights corresponding to the adjacent pixel sets.

Since the process of calculating x-direction weights wx0-wx3 and y-direction weights wy0-wy3 of the 16 adjacent pixels (p00-p33) of the interpolation pixel P'(x, y) by using a bicubic interpolation algorithm convolution kernel is relatively complicated, real-time calculation in a Shader program may affect the efficiency of interpolation. In practical application, the image scaling apparatus may perform precalculation and interpolation, determine mapping relationships among different position relationships, different virtual interpolation pixels and different grouping weights, and record a look-up table. In practical application, the look-up table includes a first look-up table recording a mapping relationship between coordinates formed by different fractional parts and different virtual interpolation pixels, and further includes a second look-up table recording a mapping relationship between coordinates formed by different fractional parts and different grouping weights.

Specifically, at least two steps of precalculation and interpolation are included.

Figure 5A:
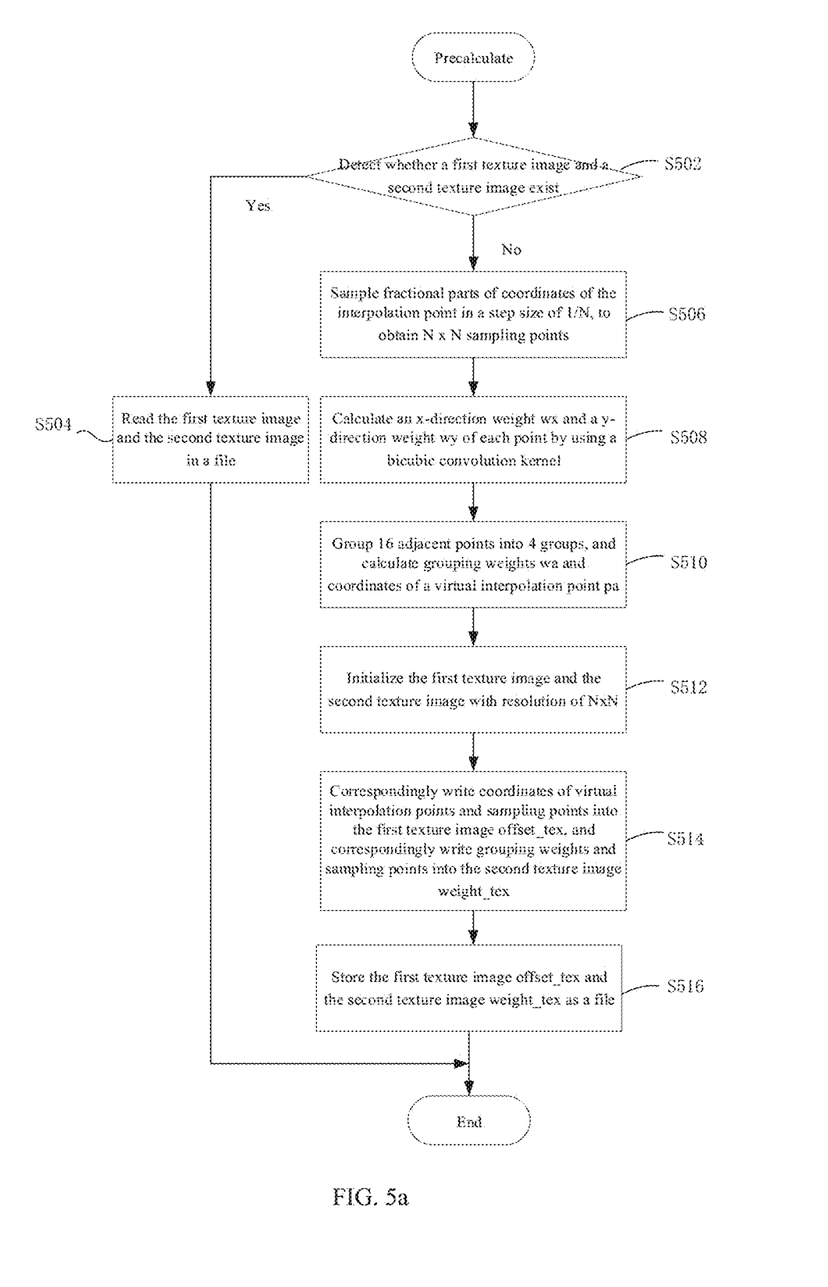
FIG. 5*a* is a step flowchart of a precalculation step according to another embodiment.

In order to facilitate the understanding of those skilled in the art, FIG. 5a exemplarily provides a step flowchart of a precalculation step. Referring to FIG. 5a, the precalculation step includes the following steps.

In step S502, it is detected whether a first texture image offset_tex and a second texture image weight_tex exist. If yes, step S504 is performed; and if no, step S506 is performed.

In step S504, the first texture image offset_tex and the second texture image weight_tex in a file are read.

In step S506, all possible values of fractional parts fx,fy (fx∈[0,1), fy∈[0,1)) of coordinates of the interpolation point P'(x, y) may be quantized in steps of 1/N, to obtain N×N discrete coordinate points, that is, sampling points.

An x-direction weight wx and a y-direction weight wy of each point are calculated using a bicubic convolution kernel.

In step S508, an x-direction weight wx and a y-direction weight wy of each point of the interpolation point P'(x, y) are calculated by using a bicubic interpolation algorithm convolution kernel.

In step S510, 16 adjacent points (p00-p33) are grouped into 4 groups, and grouping weights wa and coordinates of a virtual interpolation point pa are calculated.

In step S512, the second texture image weight_tex and the first texture image offset_tex with N×N pixels in an RGBA format are generated.

In step S514, coordinates of virtual interpolation points and sampling points are correspondingly written into the first texture image offset_tex, and grouping weights and sampling points are correspondingly written into the second texture image weight_tex.

That is, one piece of data is written into each channel for RGBA.

$$\begin{cases} \text{weight\_tex}.r = wa_0 \\ \text{weight\_tex}.g = wa_1 \\ \text{weight\_tex}.b = wa_2 \\ \text{weight\_tex}.a = wa_3 \end{cases}$$

$$\begin{cases} \text{offset\_tex}.r = pa_0.ox \\ \text{offset\_tex}.g = pa_1.ox \\ \text{offset\_tex}.b = pa_0.oy \\ \text{offset\_tex}.a = pa_2.oy \end{cases}$$

In step S516, the first texture image offset_tex and the second texture image weight_tex into which data is written are stored as a file.

Figure 5B:
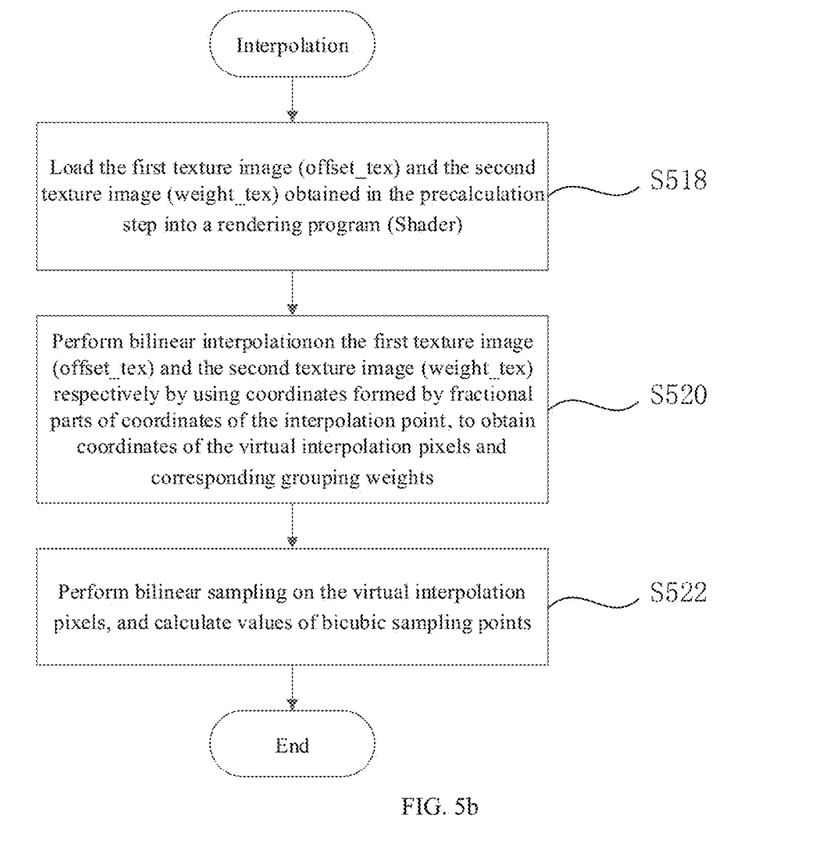
FIG. 5*b* is a step flowchart of an interpolation step according to an embodiment.

In order to facilitate the understanding of those skilled in the art, FIG. 5b exemplarily provides a step flowchart of an interpolation step. Referring to FIG. 5b, the interpolation step includes the following steps.

In step S518, the first texture image offset_tex and the second texture image weight_tex obtained in the precalculation step are loaded into a Shader program (a graphic rendering program).

In step S520, bilinear interpolation is performed on weight_tex and offset_tex respectively by using coordinates formed by fractional parts (fx, fy) of coordinates of the interpolation point P'(x, y), to obtain grouping weights wa0-wa3 and coordinates of virtual interpolation pixels pa0-pa3.

$[wa_0,wa_1,wa_2,wa_3]$=bilinear(weight_tex,(fx,fy))·rgba $[pa_0 \cdot ox, pa_1 \cdot ox, pa_0 \cdot oy, pa_2 \cdot oy]$=bilinear(offset_tex,(fx, fy))·rgba In step S522, coordinate points of interpolation pixels of the virtual interpolation pixels are calculated based on the x-direction weights wx0-wx3 and the y-direction weights wy0-wy3 of the 16 adjacent pixels (p00-p33).

Texture sampling is performed on weight_tex and offset_tex images to obtain parameters directly, which prevents real-time calculation of parameters in the Shader program, reduces a calculation load of a GPU, and speeds up.

The texture images weight_tex and offset_tex generated by precalculation may be stored as an image file, which may be directly loaded in use and may omit the repeated precalculation process.

Since bilinear texture sampling has an interpolation function, weight_tex and offset_tex with such low resolution as N=8 or N=16 may obtain sufficient sampling accuracy, which makes the texture image generated by this method sampled at a very fast speed and occupy less space.

The above image scaling method makes up for the lack of a bicubic scaling function in 3D API, realizes an efficient bicubic scaling algorithm, and takes into account the quality and speed of image scaling.

Figure 6:
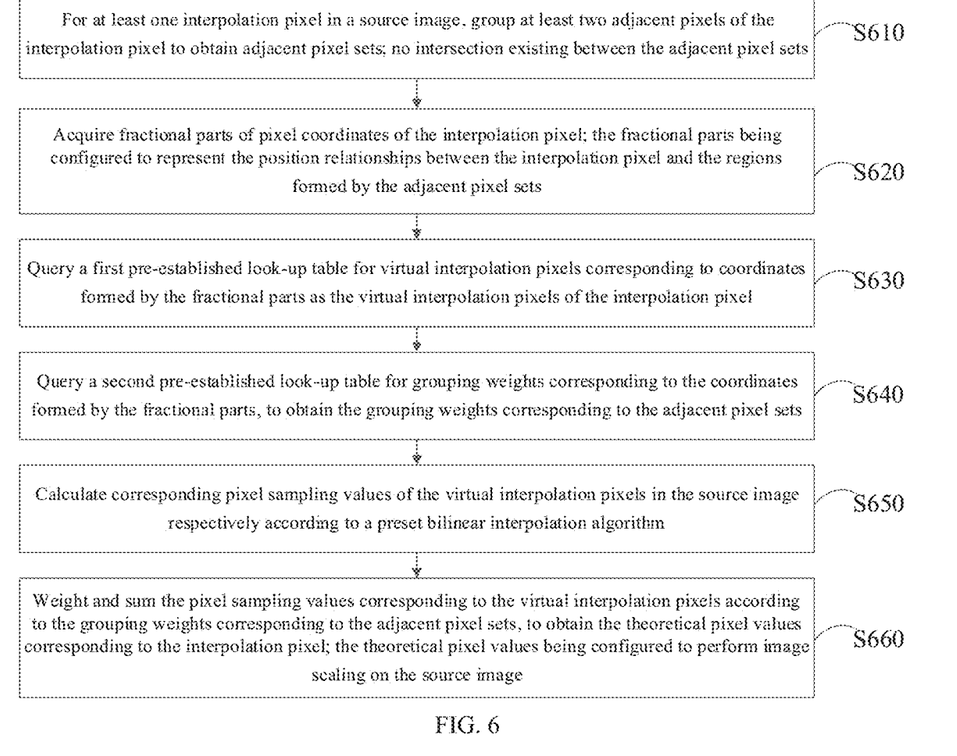
FIG. 6 is a schematic flowchart of another image scaling method according to another embodiment.

In another embodiment, as shown in FIG. 6, another image scaling method is provided. For example, the method is applied to an image scaling apparatus, and includes the following steps.

In step S610, for at least one interpolation pixel in a source image, at least two adjacent pixels of the interpolation pixel are grouped to obtain adjacent pixel sets; no intersection exists between the adjacent pixel sets.

In step S620, fractional parts of pixel coordinates of the interpolation pixel are acquired; the fractional parts being configured to represent the position relationships between the interpolation pixel and the regions formed by the adjacent pixel sets.

In step S630, a first pre-established look-up table is queried for virtual interpolation pixels corresponding to coordinates formed by the fractional parts as the virtual interpolation pixels of the interpolation pixel; wherein a mapping relationship between coordinates formed by different fractional parts and different virtual interpolation pixels is recorded in the first look-up table.

In step S640, a second pre-established look-up table is queried for grouping weights corresponding to the coordinates formed by the fractional parts, to obtain the grouping weights corresponding to the adjacent pixel sets; wherein a mapping relationship between coordinates formed by different fractional parts and different grouping weights is recorded in the second look-up table.

In step S650, corresponding pixel sampling values of the virtual interpolation pixels in the source image are calculated respectively according to a preset bilinear interpolation algorithm.

In step S660, the pixel sampling values corresponding to the virtual interpolation pixels are weighted and summed according to the grouping weights corresponding to the adjacent pixel sets, to obtain the theoretical pixel values corresponding to the interpolation pixel; the theoretical pixel values are configured to perform image scaling on the source image.

It should be understood that, although the steps in the flowcharts involved in the embodiments described above are displayed in sequence as indicated by the arrows, the steps are not necessarily performed in the order indicated by the arrows. Unless otherwise clearly specified herein, the steps are performed without any strict sequence limitation, and may be performed in other orders. In addition, at least some steps in the flowcharts involved in the embodiments described above may include a plurality of steps or a plurality of stages, and such steps or stages are not necessarily performed at a same moment, and may be performed at different moments. The steps or stages are not necessarily performed in sequence, and the steps or stages and at least some of other steps or steps or stages of other steps may be performed in turn or alternately.

Figure 7A:
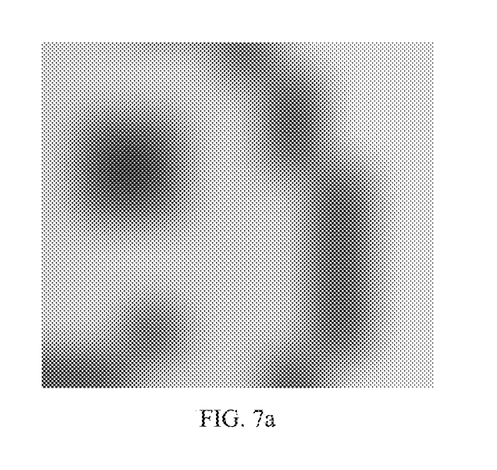
FIG. 7*a* is a diagram of an image magnification effect using a bicubic interpolation algorithm according to an embodiment.
Figure 7B:
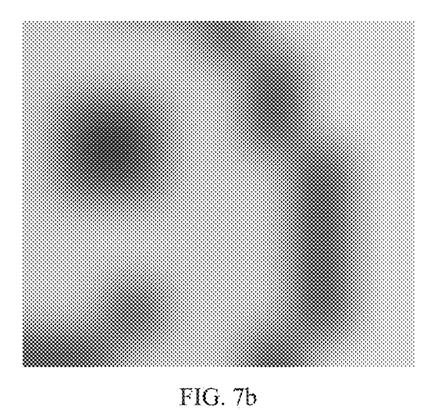
FIG. 7*b* is a diagram of an image magnification effect of an image scaling method according to an embodiment.
Figure 7C:
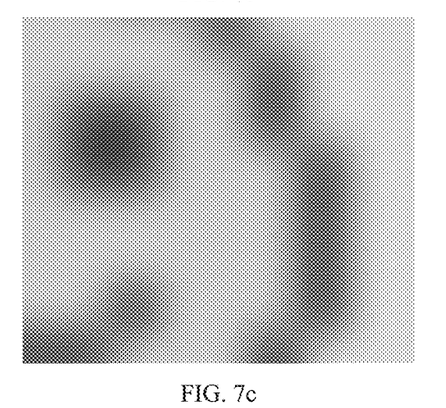
FIG. 7*c* is a diagram of an image magnification effect of another image scaling method according to an embodiment.
Figure 7D:
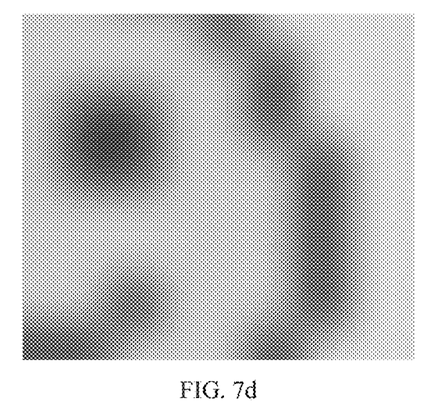
FIG. 7*d* is a diagram of an image magnification effect of an image scaling method according to another embodiment.
Figure 7E:
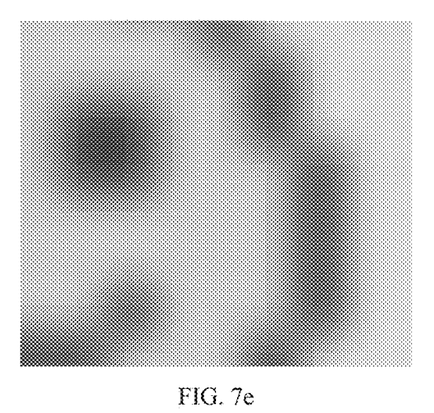
FIG. 7*e* is a diagram of an image magnification effect of another image scaling method according to another embodiment.

In order to facilitate the understanding of those skilled in the art, a source image with resolution of 20×20 may be magnified into an image with resolution of 600×600. FIG. 7a provides a diagram (partially cut) of an image magnification effect using a bicubic interpolation algorithm. FIG. 7b provides a diagram (partially cut) of an image magnification effect of an image scaling method when a resolution coefficient N of the texture image is 32. FIG. 7c provides a diagram (partially cut) of an image magnification effect obtained with the image scaling method when the resolution coefficient N of the texture image is 16. FIG. 7d provides a diagram (partially cut) of an image magnification effect obtained with the image scaling method when the resolution coefficient N of the texture image is 8. FIG. 7e provides a diagram (partially cut) of an image magnification effect obtained with the image scaling method when the resolution coefficient N of the texture image is 4. As can be seen, when the resolution coefficient N of the texture image is 32 or 16, no visible obvious difference exists between the magnified image and an image obtained by image magnification by using a bicubic interpolation algorithm in the conventional art. When the resolution coefficient N of the texture image is 8, there is a visible but acceptable reduction in image quality. When the resolution coefficient N of the texture image is 4, there is an obvious reduction in image quality.

In practical application, similarities between FIG. 7a and FIG. 7b, FIG. 7c, FIG. 7d, FIG. 7e may be compared by using a peak signal-to-noise ratio (PSNR). The PSNR may be expressed as:

$$PSNR = 10\log_{10}\frac{\text{MAX}_f^2}{MSE}$$

where $\text{MAX}_f$ denotes a maximum color value of a pixel, which is 255 for an image of 8 bits. A mean square error (MSE) may be defined as:

$$MSE = \frac{1}{NM} * \sum_{i=0}^{N-1}\sum_{j=0}^{M-1}(C_{ij} - R_{ij})^2$$

Refer to Table 1 for the similarities between FIG. 7a and FIG. 7b, FIG. 7c, FIG. 7d, FIG. 7e.

TABLE 1

| Image obtained according to the present disclosure | PSNR | Pixel error |
|---|---|---|
| FIG. 7b | 52.36 | 0.61 |
| FIG. 7c | 50.91 | 0.73 |
| FIG. 7d | 49.12 | 0.89 |
| FIG. 7e | 42.79 | 1.85 |

In practical application, a test of a 360 vehicle-mounted panoramic image mosaic application shows that the method according to the present disclosure can significantly improve an interpolation speed compared with the bicubic interpolation algorithm. Refer to Table 2 for the interpolation speed.

TABLE 2

| Interpolation method | Display frame rate fps |
|---|---|
| Bicubic interpolation algorithm | 7.4 |
| The above image scaling method (N is 32) | 47.1 |
| The above image scaling method (N is 8) | 51.9 |

Based on the same invention concept, an embodiment of the present disclosure further provides an image scaling apparatus configured to perform the image scaling method described above. The apparatus provides an implementation solution to the problem similar to that described in the above method. Therefore, specific limitations in the embodiments of one or more image scaling apparatuses provided below may be obtained with reference to the limitations on the image scaling method above, which are not described in detail herein.

Figure 8:
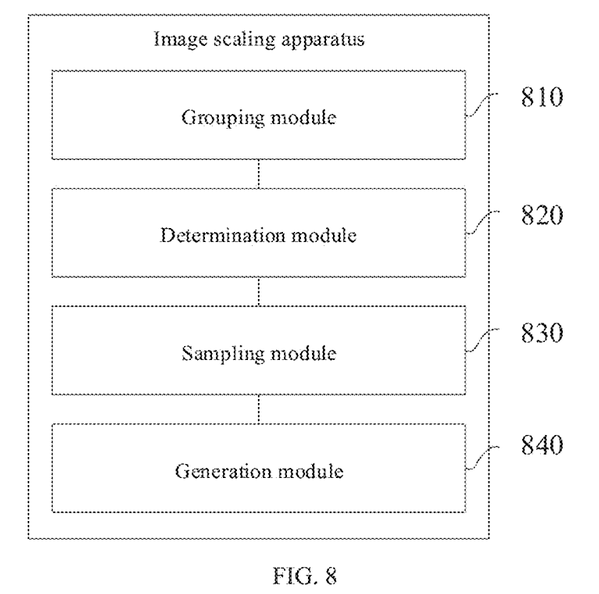
FIG. 8 is a structural block diagram of an image scaling apparatus according to an embodiment.

In one embodiment, as shown in FIG. 8, an image scaling apparatus is provided, including:
 a grouping module 810 configured to, for at least one interpolation pixel in a source image, group at least two adjacent pixels of the interpolation pixel to obtain adjacent pixel sets; no intersection existing between the adjacent pixel sets;

a determination module 820 configured to determine, based on position relationships between the interpolation pixel and regions formed by the adjacent pixel sets, virtual interpolation pixels corresponding to the interpolation pixel in the regions formed by the adjacent pixel sets respectively;

a sampling module 830 configured to calculate corresponding pixel sampling values of the virtual interpolation pixels in the source image according to a preset bilinear interpolation algorithm respectively; and a generation module 840 configured to generate theoretical pixel values corresponding to the interpolation pixel based on the pixel sampling values corresponding to the virtual interpolation pixels; the theoretical pixel values being configured to perform image scaling on the source image.

In one embodiment, the determination module 820 is specifically configured to acquire fractional parts of pixel coordinates of the interpolation pixel; the fractional parts being configured to represent the position relationships between the interpolation pixel and the regions formed by the adjacent pixel sets; calculate weights of adjacent pixels in the adjacent pixel sets in at least two directions according to the fractional parts based on a preset bicubic interpolation algorithm; and determine, based on the weights of the adjacent pixels in the adjacent pixel sets in the at least two directions, the virtual interpolation pixels corresponding to the interpolation pixel in the regions formed by the adjacent pixel sets.

In one embodiment, the determination module 820 is specifically configured to acquire fractional parts of pixel coordinates of the interpolation pixel; the fractional parts being configured to represent the position relationships between the interpolation pixel and the regions formed by the adjacent pixel sets; and query a first pre-established look-up table for virtual interpolation pixels corresponding to coordinates formed by the fractional parts as the virtual interpolation pixels of the interpolation pixel; wherein a first mapping relationship between different preset coordinates and different virtual interpolation pixels is recorded in the first look-up table.

In one embodiment, the first look-up table is a first texture image, the first texture image is an image generated by fitting the first mapping relationship, and the determination module 820 is specifically configured to perform bilinear interpolation on the first texture image by using the coordinates formed by the fractional parts, to obtain first interpolation results corresponding to the coordinates formed by the fractional parts; and take the first interpolation results corresponding to the coordinates formed by the fractional parts as the virtual interpolation pixels of the interpolation pixel.

In one embodiment, the generation module 840 is specifically configured to acquire, based on the position relationships between the interpolation pixel and the regions formed by the adjacent pixel sets, grouping weights corresponding to the adjacent pixel sets; and weight and sum the pixel sampling values corresponding to the virtual interpolation pixels according to the grouping weights corresponding to the adjacent pixel sets, to obtain the theoretical pixel values corresponding to the interpolation pixel.

In one embodiment, the generation module 840 is specifically configured to acquire fractional parts of pixel coordinates of the interpolation pixel; the fractional parts being configured to represent the position relationships between the interpolation pixel and the regions formed by the adjacent pixel sets; calculate weights of adjacent pixels in the adjacent pixel sets in at least two directions according to the fractional parts based on a preset bicubic interpolation algorithm; and determine the grouping weights corresponding to the adjacent pixel set according to the weights of the adjacent pixels in the adjacent pixel sets in the at least two directions.

In one embodiment, the generation module 840 is specifically configured to acquire fractional parts of pixel coordinates of the interpolation pixel; the fractional parts being configured to represent the position relationships between the interpolation pixel and the regions formed by the adjacent pixel sets; and query a second pre-established look-up table for grouping weights corresponding to coordinates formed by the fractional parts, to obtain the grouping weights corresponding to the adjacent pixel sets; wherein a second mapping relationship between different preset coordinates and different grouping weights is recorded in the second look-up table.

In one embodiment, the second look-up table is a second texture image, the second texture image is an image generated by fitting the second mapping relationship, and the generation module 840 is specifically configured to perform bilinear interpolation on the second texture image by using the coordinates formed by the fractional parts, to obtain second interpolation results corresponding to the coordinates formed by the fractional parts; and determine the second interpolation results corresponding to the coordinates formed by the fractional parts as the grouping weights corresponding to the adjacent pixel sets.

The modules in the image scaling apparatus may be implemented entirely or partially by software, hardware, or a combination thereof. The above modules may be built in or independent of a processor of the image scaling apparatus in a hardware form, or may be stored in a memory of the image scaling apparatus in a software form, so that the processor calls and performs operations corresponding to the above modules.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted that those of ordinary skill in the art may further make variations and improvements without departing from the conception of the present disclosure, and these all fall within the protection scope of the present disclosure. Therefore, the protection scope of the present disclosure should be subject to the appended claims.

What is claimed is:

1. An image scaling method, comprising:
   for at least one interpolation pixel in a source image, grouping at least two adjacent pixels of the interpolation pixel to obtain adjacent pixel sets; no intersection existing between the adjacent pixel sets;
   determining, based on position relationships between the interpolation pixel and regions formed by the adjacent pixel sets, virtual interpolation pixels corresponding to the interpolation pixel in the regions formed by the adjacent pixel sets respectively;

calculating corresponding pixel sampling values of the virtual interpolation pixels in the source image according to a preset bilinear interpolation algorithm respectively; and generating theoretical pixel values corresponding to the interpolation pixel based on the pixel sampling values corresponding to the virtual interpolation pixels; the theoretical pixel values being configured to perform image scaling on the source image.

2. The method according to claim 1, wherein the determining, based on position relationships between the interpolation pixel and regions formed by the adjacent pixel sets, virtual interpolation pixels corresponding to the interpolation pixel in the regions formed by the adjacent pixel sets respectively comprises:

acquiring fractional parts of pixel coordinates of the interpolation pixel; the fractional parts being configured to represent the position relationships between the interpolation pixel and the regions formed by the adjacent pixel sets;

calculating weights of adjacent pixels in the adjacent pixel sets in at least two directions according to the fractional parts based on a preset bicubic interpolation algorithm; and determining, based on the weights of the adjacent pixels in the adjacent pixel sets in the at least two directions, the virtual interpolation pixels corresponding to the interpolation pixel in the regions formed by the adjacent pixel sets.

3. The method according to claim 1, wherein the determining, based on position relationships between the interpolation pixel and regions formed by the adjacent pixel sets, virtual interpolation pixels corresponding to the interpolation pixel in the regions formed by the adjacent pixel sets respectively comprises:

acquiring fractional parts of pixel coordinates of the interpolation pixel; the fractional parts being configured to represent the position relationships between the interpolation pixel and the regions formed by the adjacent pixel sets; and querying a first pre-established look-up table for virtual interpolation pixels corresponding to coordinates formed by the fractional parts as the virtual interpolation pixels of the interpolation pixel; wherein a first mapping relationship between different preset coordinates and different virtual interpolation pixels is recorded in the first look-up table.

4. The method according to claim 3, wherein the first look-up table is a first texture image, the first texture image is an image generated by fitting the first mapping relationship, and the querying a first pre-established look-up table for virtual interpolation pixels corresponding to coordinates formed by the fractional parts as the virtual interpolation pixels of the interpolation pixel comprises:

performing bilinear interpolation on the first texture image by using the coordinates formed by the fractional parts, to obtain first interpolation results corresponding to the coordinates formed by the fractional parts; and taking the first interpolation results corresponding to the coordinates formed by the fractional parts as the virtual interpolation pixels of the interpolation pixel.

5. The method according to claim 1, wherein the generating theoretical pixel values corresponding to the interpolation pixel based on the pixel sampling values corresponding to the virtual interpolation pixels comprises:

acquiring, based on the position relationships between the interpolation pixel and the regions formed by the adjacent pixel sets, grouping weights corresponding to the adjacent pixel sets; and weighting and summing the pixel sampling values corresponding to the virtual interpolation pixels according to the grouping weights corresponding to the adjacent pixel sets, to obtain the theoretical pixel values corresponding to the interpolation pixel.

6. The method according to claim 5, wherein the acquiring, based on the position relationships between the interpolation pixel and the regions formed by the adjacent pixel sets, grouping weights corresponding to the adjacent pixel sets comprises:

acquiring fractional parts of pixel coordinates of the interpolation pixel; the fractional parts being configured to represent the position relationships between the interpolation pixel and the regions formed by the adjacent pixel sets;

calculating weights of adjacent pixels in the adjacent pixel sets in at least two directions according to the fractional parts based on a preset bicubic interpolation algorithm; and determining the grouping weights corresponding to the adjacent pixel set according to the weights of the adjacent pixels in the adjacent pixel sets in the at least two directions.

7. The method according to claim 5, wherein the acquiring, based on the position relationships between the interpolation pixel and the regions formed by the adjacent pixel sets, grouping weights corresponding to the adjacent pixel sets comprises:

acquiring fractional parts of pixel coordinates of the interpolation pixel; the fractional parts being configured to represent the position relationships between the interpolation pixel and the regions formed by the adjacent pixel sets; and querying a second pre-established look-up table for grouping weights corresponding to coordinates formed by the fractional parts, to obtain the grouping weights corresponding to the adjacent pixel sets; wherein a second mapping relationship between different preset coordinates and different grouping weights is recorded in the second look-up table.

8. The method according to claim 7, wherein the second look-up table is a second texture image, the second texture image is an image generated by fitting the second mapping relationship, and the querying a second pre-established look-up table for grouping weights corresponding to coordinates formed by the fractional parts, to obtain the grouping weights corresponding to the adjacent pixel sets comprises:

performing bilinear interpolation on the second texture image by using the coordinates formed by the fractional parts, to obtain second interpolation results corresponding to the coordinates formed by the fractional parts; and determining the second interpolation results corresponding to the coordinates formed by the fractional parts as the grouping weights corresponding to the adjacent pixel sets.

9. An image scaling apparatus, comprising:

a grouping module configured to, for at least one interpolation pixel in a source image, group at least two adjacent pixels of the interpolation pixel to obtain adjacent pixel sets; no intersection existing between the adjacent pixel sets;

a determination module configured to determine, based on position relationships between the interpolation pixel and regions formed by the adjacent pixel sets, virtual interpolation pixels corresponding to the interpolation pixel in the regions formed by the adjacent pixel sets respectively;

a sampling module configured to calculate corresponding pixel sampling values of the virtual interpolation pixels in the source image according to a preset bilinear interpolation algorithm respectively; and a generation module configured to generate theoretical pixel values corresponding to the interpolation pixel based on the pixel sampling values corresponding to the virtual interpolation pixels; the theoretical pixel values being configured to perform image scaling on the source image.

10. The apparatus according to claim 9, wherein the determination module is specifically configured to acquire fractional parts of pixel coordinates of the interpolation pixel; the fractional parts being configured to represent the position relationships between the interpolation pixel and the regions formed by the adjacent pixel sets; calculate weights of adjacent pixels in the adjacent pixel sets in at least two directions according to the fractional parts based on a preset bicubic interpolation algorithm; and determine, based on the weights of the adjacent pixels in the adjacent pixel sets in the at least two directions, the virtual interpolation pixels corresponding to the interpolation pixel in the regions formed by the adjacent pixel sets.

11. The apparatus according to claim 9, wherein the determination module is specifically configured to acquire fractional parts of pixel coordinates of the interpolation pixel; the fractional parts being configured to represent the position relationships between the interpolation pixel and the regions formed by the adjacent pixel sets; and query a first pre-established look-up table for virtual interpolation pixels corresponding to coordinates formed by the fractional parts as the virtual interpolation pixels of the interpolation pixel; wherein a first mapping relationship between different preset coordinates and different virtual interpolation pixels is recorded in the first look-up table.

12. The apparatus according to claim 11, wherein the first look-up table is a first texture image, the first texture image is an image generated by fitting the first mapping relationship, and the determination module is specifically configured to perform bilinear interpolation on the first texture image by using the coordinates formed by the fractional parts, to obtain first interpolation results corresponding to the coordinates formed by the fractional parts; and take the first interpolation results corresponding to the coordinates formed by the fractional parts as the virtual interpolation pixels of the interpolation pixel.

13. The apparatus according to claim 9, wherein the generation module is specifically configured to acquire, based on the position relationships between the interpolation pixel and the regions formed by the adjacent pixel sets, grouping weights corresponding to the adjacent pixel sets; and weight and sum the pixel sampling values corresponding to the virtual interpolation pixels according to the grouping weights corresponding to the adjacent pixel sets, to obtain the theoretical pixel values corresponding to the interpolation pixel.

14. The apparatus according to claim 13, wherein the generation module is specifically configured to acquire fractional parts of pixel coordinates of the interpolation pixel; the fractional parts being configured to represent the position relationships between the interpolation pixel and the regions formed by the adjacent pixel sets; calculate weights of adjacent pixels in the adjacent pixel sets in at least two directions according to the fractional parts based on a preset bicubic interpolation algorithm; and determine the grouping weights corresponding to the adjacent pixel set according to the weights of the adjacent pixels in the adjacent pixel sets in the at least two directions.

15. The apparatus according to claim 13, wherein the generation module is specifically configured to acquire fractional parts of pixel coordinates of the interpolation pixel; the fractional parts being configured to represent the position relationships between the interpolation pixel and the regions formed by the adjacent pixel sets; and query a second pre-established look-up table for grouping weights corresponding to coordinates formed by the fractional parts, to obtain the grouping weights corresponding to the adjacent pixel sets; wherein a second mapping relationship between different preset coordinates and different grouping weights is recorded in the second look-up table.

16. The apparatus according to claim 15, wherein the second look-up table is a second texture image, the second texture image is an image generated by fitting the second mapping relationship, and the generation module is specifically configured to perform bilinear interpolation on the second texture image by using the coordinates formed by the fractional parts, to obtain second interpolation results corresponding to the coordinates formed by the fractional parts; and determine the second interpolation results corresponding to the coordinates formed by the fractional parts as the grouping weights corresponding to the adjacent pixel sets.

* * * * *